(12) United States Patent
Bottiglieri et al.

(10) Patent No.: US 7,286,478 B2
(45) Date of Patent: *Oct. 23, 2007

(54) USAGE PARAMETER CONTROL DEVICE FOR ASYNCHRONOUS TRANSFER MODE SYSTEM

(75) Inventors: Michael P. Bottiglieri, River Vale, NJ (US); Michael J. Samori, Cliffside Park, NJ (US)

(73) Assignee: Fujitsu Limited, Kawasaki (JP)

( * ) Notice: Subject to any disclaimer, the term of this patent is extended or adjusted under 35 U.S.C. 154(b) by 1040 days.

This patent is subject to a terminal disclaimer.

(21) Appl. No.: 10/260,174

(22) Filed: Sep. 27, 2002

(65) Prior Publication Data

US 2003/0031131 A1    Feb. 13, 2003

Related U.S. Application Data

(63) Continuation of application No. 09/144,289, filed on Aug. 31, 1998, now Pat. No. 6,477,146.

(51) Int. Cl.
*H04J 3/14* (2006.01)

(52) U.S. Cl. .................. 370/235; 370/395.21

(58) Field of Classification Search ............... 370/235, 370/252, 395.21, 229, 230, 232, 233, 234
See application file for complete search history.

(56) References Cited

U.S. PATENT DOCUMENTS

| | | | |
|---|---|---|---|
| 5,854,783 A | 12/1998 | Kaganoi | 370/232 |
| 5,914,935 A | 6/1999 | Saito | 370/229 |
| 5,914,936 A | 6/1999 | Hatono et al. | 370/230 |
| 5,930,234 A | 7/1999 | Yoshida | 370/232 |
| 5,991,274 A | 11/1999 | Grunenfelder et al. | 370/253 |
| 6,064,651 A * | 5/2000 | Rogers et al. | 370/233 |
| 6,081,507 A | 6/2000 | Chao et al. | 370/235 |
| 6,324,165 B1 | 11/2001 | Fan et al. | 370/232 |
| 6,377,583 B1 * | 4/2002 | Lyles et al. | 370/412 |
| 6,389,019 B1 * | 5/2002 | Fan et al. | 370/395.42 |
| 6,389,031 B1 * | 5/2002 | Chao et al. | 370/412 |
| 6,466,542 B1 * | 10/2002 | Bottiglieri et al. | 370/230 |
| 6,477,146 B1 * | 11/2002 | Bottiglieri et al. | 370/235 |
| 6,480,470 B1 * | 11/2002 | Breivik | 370/252 |

OTHER PUBLICATIONS

McDysan, et al., "ATM Theory and Application," Chapter 13, *McGraw-Hill Series on Computer Communications*, pp. 365-385, 1995.

Erdengiz, All, "ATM Usage Policing and Traffic Shaping," *Communication Systems Design*, Jan. 1997.

ATM Forum, "ATM User-Network Interface Specification," Sep. 1994, Version 3.1.

* cited by examiner

*Primary Examiner*—Min Jung
(74) *Attorney, Agent, or Firm*—Baker Botts LLP

(57) ABSTRACT

In a usage parameter control device for an asynchronous transfer mode communications system, a determination is made as to whether either of the respective storage elements maintaining values for (1) the time of arrival of a cell ($T_{TA}$ and (2) the time value at which the "bucket" will have drained to an empty condition ($T_{TAT}$) has wrapped relative to the other. The wrap determination is made prior to the comparison between the $T_{TA}$ and $T_{TAT}$ values which is made in order to determine whether the user is complying with his or her contracted parameters. If one of the storage elements has wrapped relative to the other, the comparison between the $T_{TA}$ and $T_{TAT}$ values is modified accordingly.

19 Claims, 3 Drawing Sheets

USAGE PARAMETER CONTROL DEVICE FOR ASYNCHRONOUS TRANSFER MODE SYSTEM

CROSS-REFERENCE TO RELATED APPLICATION

This application is a continuation of U.S. patent application Ser. No. 09/144,289 filed Aug. 31, 1998 and entitled "Usage Parameter Control Device for Asynchronous Transfer Mode System" now U.S. Pat. No. 6,477,146.

TECHNICAL FIELD OF INVENTION

The following invention relates generally to the improved operation of a usage parameter control (UPC) device for asynchronous transfer mode (ATM) communications systems, and in particular, to following wrapping of finite counter and register elements used to keep track of infinitely progressing time.

BACKGROUND OF THE INVENTION

In recent years, ATM communication has become increasingly popular. Prior to this preference for ATM, time division multiplexing (TDM) systems were the preferred mode of communication. In TDM systems, each user was allocated a particular time slot within a standard time interval during which a communication channel would be dedicated to the user. In this system, the time slot would be unavailable to other users regardless of whether the allocated user was actually using it which frequently resulted in wasted bandwidth.

In ATM systems, by contrast, information is transmitted as bandwidth is available without regard to time. In order to keep ATM traffic flowing, each user agrees, by way of a contract with the ATM network operator, to a minimum length of time, t, between transmission of his or her cells. A maximum number of cells which may be transmitted in an interval, T, is also agreed upon. The time, t, determines the user's peak cell rate (PCR) and the interval, T, determines the user's sustained cell rate (SCR). A third parameter, maximum burst size (MBS) which specifies the maximum number of cells which are permitted to be transmitted consecutively at the PCR, is also contracted for. In order to prevent users from exceeding their respective limitations, ATM networks may employ a UPC device which can monitor these and other usage parameters.

In an ATM system, UPC monitoring is typically performed in accordance with standard generic cell rate algorithms (GCRAs). Once such GCRA is a "leaky bucket" algorithm, in which a figurative bucket "fills" proportional to the actual cell rate received from a user and "drains" at a fixed rate proportional to the contracted service rate parameters. If the user exceeds the limits on contracted parameters, such as PCR or SCR, the "bucket" will "overflow" and the user's cells may be either discarded or tagged as having a low priority.

ATM communications may be carried out using a constant bit rate (CBR) or using a variable bit rate (VBR). A CBR connection essentially mimics the old TDM systems. Monitoring of a CBR connection is accomplished using a single leaky bucket. Conformance is characterized by the peak cell rate (PCR) and the corresponding cell delay variation tolerance (CDVT) due to, e.g., head-of-line blocking. The CDVT is defined in relation to the PCR. The capacity of the leaky bucket is 1/PCR (a.k.a. IP)+CDVT specified for the cell flow. The drain rate of the PCR bucket is 1/PCR.

FIG. 1 is a flow chart illustrating the operation of a leaky bucket GCRA used to monitor usage parameters for a CBR connection. In block 102, a cell arrives at time$_T$. Thereafter $T_{TATp}$ for the particular user is read from memory in block 105. $T_{TATp}$ is the time value at which the "bucket" will have drained to an empty condition in the absence of new cell arrivals. It is calculated during cell arrivals and is adjusted in proportion to the contracted PCR rate for CBR service. In Block 107 a comparison between $T_{TA}$ and $T_{TATp}$ is performed. If $T_{TA}$ is greater than $T_{TATp}$, i.e. the cell arrived after the bucket had completely emptied, then the cell is accepted at block 111, and, at block 114, $T_{TATp}$ is set to $T_{TA}$+1/PCR. If $T_{TA}$ is not greater than $T_{TATp}$, i.e. the bucket is not completely empty, a check is done in block 117 to determine if there is enough room in the partially full bucket to accept the cell based on its maximum capacity of 1/PCR+CDVT. If not, the cell is discarded at block 120. If so, the cell is accepted at block 122, and $T_{TATp}$ is updated at block 125 to equal $T_{TATp}$+1/PCR.

In a variable bit rate (VBR) system, a second leaky bucket GCRA is used in addition to the first leaky bucket GCRA described above in order to ensure compliance with the contracted sustained cell rate (SCR) and maximum burst size (MBS). The capacity of this second leaky bucket is 1/SCR+Burst Tolerance (BT)+CDVT. Burst tolerance is calculated from the contracted SCR, PCR, and MBS, and is the additional bucket depth required to hold "MBS−1" more cells arriving at the PCR rate (BT={MBS−1}×{1/SCR−1/PCR}). The sum of BT and CDVT is given the identifier "L". The drain rate of this bucket is 1/SCR FIG. 2 shows the flow diagram for this second GCRA for the case where it is used in conjunction with the GCRA of FIG. 1. If a cell is accepted in accordance with the GCRA of FIG. 1, i.e., either of boxes 128 or 131 of FIG. 1 are reached, then $T_{TATs}$ is retrieved from memory in block 137. $T_{TATs}$ is the time value at which the "bucket" will have drained to an empty condition in the absence of new cell arrivals, and is calculated in increments of 1/SCR which provides enough time for a full bucket to leak enough to provide room for another cell. A comparison between the $T_{TA}$ of the cell from box 102 of FIG. 1 and the theoretical arrival time, $T_{TATs}$, is then performed at box 140.

If the result of the comparison of box 140 is that $T_{TA}$ is greater than $T_{TATs}$, then the cell is accepted at box 143, and $T_{TATs}$ is set to $T_{TA}$+1/SCR at box 146. If the result of box 140 is that $T_{TA}$ is not greater than $T_{TATs}$, then the system checks at box 149 to see whether the sum of $T_{TA}$ plus the burst tolerance (BT) plus the CDVT is greater than $T_{TATs}$, where BT is a function of the contracted parameters MBS, PCR and SCR. If not, the cell is non-conforming and is discarded at box 152. If, on the other hand, the condition $T_{TA}$+BT+CDVT>$T_{TATs}$ is met, the cell is accepted at box 155 and $T_{TATs}$ is set to $T_{TATs}$+1/SCR at box 158.

A brief example using simple, if not practical, hypothetical figures for SCR, MBS and PCR will better illustrate the operation of the leaky bucket of FIG. 2. Assuming a VBR service with contracted parameters of SCR=5 cells/sec, a MBS=3 cells, and a PCR of 100 cells/sec and CDVT of 0.02 sec. This results in 1/SCR=IS=0.2 sec/cell, BT=0.38 sec, and L=BT+CDVT=0.4 sec. For the purposes of this example, assume that the criteria of the first leaky bucket check against PCR and CDVT is always favorable and that the initial value of $T_{TATs}$ is 0.0. If a first cell is transmitted at 0.01 seconds, i.e., $T_{TA}$=0.01, the result of box 140 is that $T_{TA}$>$T_{TATs}$ so that the cell is accepted at box 143 and $T_{TATs}$ is set to $T_{TATs}$+1/SCR, i.e., 0.0+0.2=0.2 sec at box 146. A second cell now arrives at time 0.02 seconds. The result of box 140 is that $T_{TA}<T_{TATs}$ so that the condition $T_{TA}$+L>$T_{TATs}$ is checked at box 149. We find that this condition is met (0.02+0.4>0.2). The cell is accepted at box 155 and $T_{TATs}$ is set to $T_{TATs}$+1/SCR, i.e., 0.2+0.2=0.4 sec at box 158. Similarly, a third cell arrivals at 0.03 sec, the cell is accepted and $T_{TATs}$ is set to 0.6 sec. If a fourth cell arrives at 0.04 sec, $T_{TA}$+L will not be greater than $T_{TATs}$. The fourth cell is therefore discarded at box 152 and $T_{TATs}$ remains unchanged at 0.6 sec. The same result occurs for any cell received earlier than time 0.2 seconds. After that time, the condition $T_{TA}$+L>$T_{TATs}$ of box 149 is again met. Furthermore, if the fifth cell does not arrive until a time later than 0.6 sec, the bucket will be completely empty and the $T_{TA}>T_{TATs}$ condition will be met.

Those skilled in the art will appreciate that the above description is a simplified explanation of ATM systems, the role of UPC devices and leaky buckets generally. With respect to ATM systems, detailed explanations of the operation of such systems may be found in User Network Interface Specification (UNI) 3.1 published by the ATM Forum. The present invention is intended for use in systems designed in accordance with the standards presented therein, but is not so limited. Moreover, leaky bucket GCRAs have myriad design applications in which the present invention may be employed.

While the UNI Specification provides broad standards for designing ATM systems, there is little or no guidance provided for many practical problems encountered in implementation. One such problem is that counters and registers of infinite memory are not available to keep track of time, and finite-memory counters and registers will eventually reach their limit and reset to zero. This problem is hereafter referred to as "wrapping." A wrapping of the current time counter from which the cell arrival time $T_{TA}$ is read and/or the register which stores $T_{TA}$ without a consequent wrapping of the register which stores the theoretical arrival time $T_{TAT}$ will cause subsequent comparisons between $T_{TAT}$ and $T_{TA}$ to yield unwanted results. For example, if the current time counter wraps to zero, it will appear that the arrival time, $T_{TA}$, is much earlier than it actually is, and the comparison between $T_{TA}$ and $T_{TAT}$ will show that $T_{TA}$ is less than $T_{TAT}$, indicating a violation of the contracted transmission rate when, in fact, no such violation occurred.

SUMMARY OF THE INVENTION

In accordance with the present invention, in a usage parameter control device for an asynchronous transfer mode communications system, a determination is made as to whether either of the respective storage elements maintaining values for (1) the time of arrival of a cell ($T_{TA}$) and (2) the time value at which the "bucket" will have drained to an empty condition ($T_{TAT}$) has wrapped relative to the other. The determination is made prior to comparing the $T_{TA}$ and $T_{TAT}$ values in order to determine whether the user is complying with his or her contracted parameters.

In accordance with a further aspect of the invention, a wrap state is maintained for each virtual connection (VC). A wrap state indicates the wrap status of the respective storage elements maintaining values for $T_{TA}$ and $T_{TAT}$ relative to one another. The comparisons between $T_{TA}$ and $T_{TAT}$ which determine whether a user is in conformance with his or her contracted parameters are then modified accordingly. The wrap state for each VC is updated during a wrap audit each time the current time counter, i.e., the counter from which $T_{TA}$ is read, wraps.

In accordance with a further aspect of the invention, in order to avoid excessive delays in cell processing which may be caused by the wrap audit in a system capable of maintaining a relatively large number of VCs, the VCs are divided into a predetermined number of groups and the current time counter is divided into an equal number of phases such that wrap state audits are performed on a staggered group-by-group basis.

It is therefore an object of the present invention to provide a UPC system which will take into account the wrapping of storage elements containing the values of $T_{TAT}$ and $T_{TA}$.

It is a further object of the present invention to provide a UPC system with the ability to perform wrap audits for each VC on a regular basis without causing unacceptable delay to the function of the ATM system.

For a better understanding of the present invention, together with other and further objects, reference is made to the following description, taken in conjunction with the accompanying drawings and its scope will be pointed out in the appended claims.

DETAILED DESCRIPTION OF THE INVENTION

Wrap States

In an ATM system according to the present invention each GCRA for a virtual connection (VC) will have a two-bit state machine which will maintain relative wrap states, $W_S$, between the registers storing the values for $T_{TAT}$ and $T_{TA}$ (hereafter "the $T_{TAT}$ register" and "the $T_{TA}$ register," respectively). The term "register" is used herein in a generic sense and is intended to encompass any suitable storage element. The wrap states are shown in the following Table 1.

TABLE 1

| $W_S$ | Definition |
|---|---|
| 00 | $T_{TAT}$ register and $T_{TA}$ register are synchronized |
| 01 | $T_{TAT}$ register is wrapped ahead of $T_{TA}$ register |
| 1X | $T_{TA}$ register is wrapped ahead of $T_{TAT}$ register |

A wrap state of 00 indicates that the $T_{TAT}$ and the $T_{TA}$ registers are in synch with one another, i.e., neither is wrapped relative to the other. A wrap state of 01 indicates that the $T_{TAT}$ register has wrapped ahead of the $T_{TA}$ register. A wrap state of 1x, i.e., either 10 or 11, indicates that the $T_{TA}$ register has wrapped ahead of the $T_{TAT}$ register. In a system employing two leaky buckets, one state machine is used to keep track of the wrap state between the respective registers used to store $T_{TATp}$ and $T_{TA}$, and a second state machine is used to keep track of the wrap state between the respective registers used to store $T_{TATs}$ and $T_{TA}$.

Figure 3:
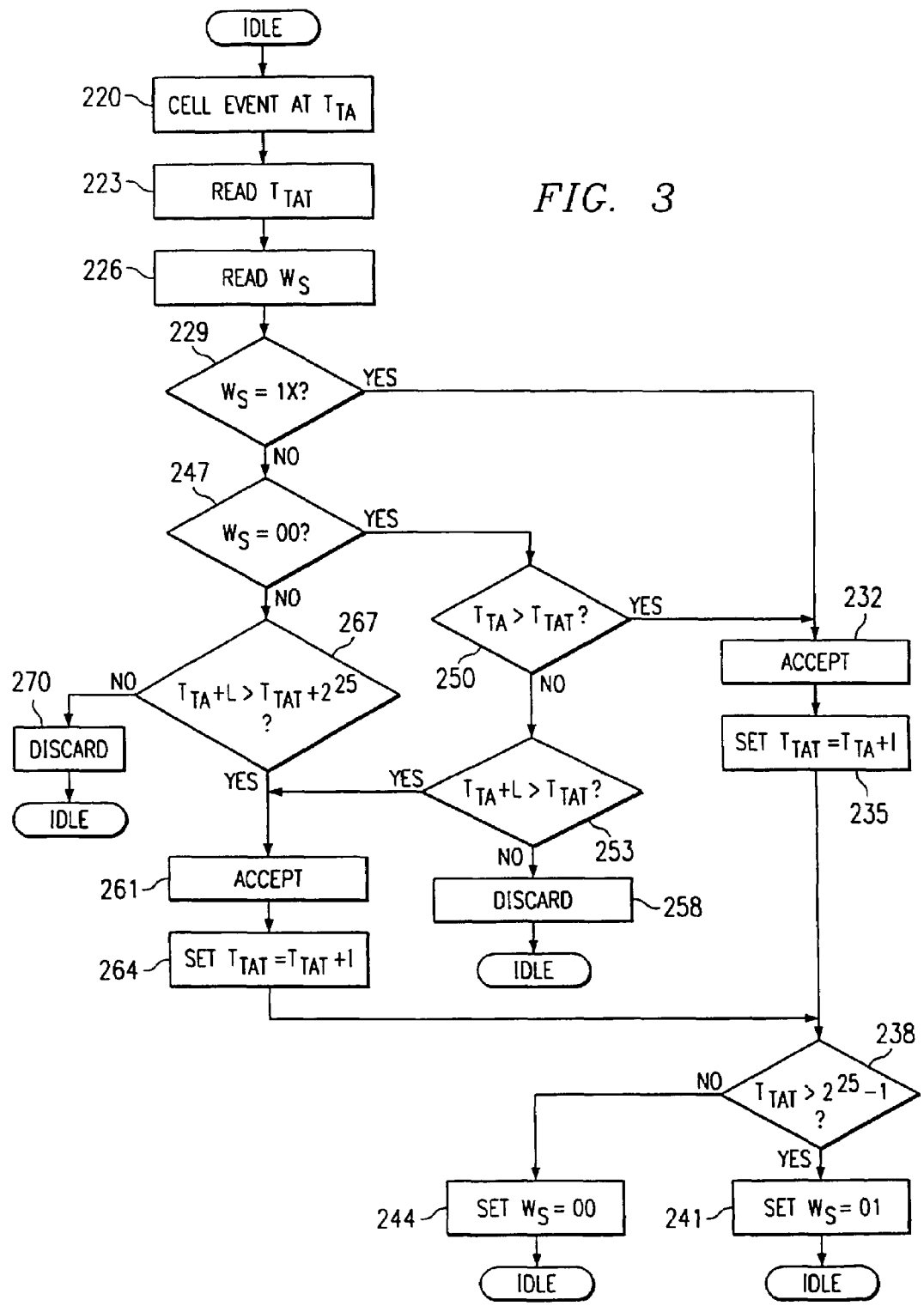
FIG. 3 is a flow diagram for a leaky bucket generic cell rate algorithm in accordance with the present invention.

FIG. 3 depicts an improved leaky bucket GCRA in accordance with the present invention. For purposes of simplification, neither CBR nor VBR is assumed. Also, for purposes of illustrating the operation of the invention, 25-bit registers for $T_{TA}$ and $T_{TAT}$, a 25-bit counter for maintaining current time, and a 6.25 MHZ counter clock (one quarter of a 25 MHZ system clock) are assumed. In such a system, the 25-bit current time counter, i.e., the counter from which $T_{TA}$ is read, will be updated every 160 nsec and hence will wrap every 5.368 seconds.

At box 220 of FIG. 3, a cell arrives when the current time counter is at $T_{TA}$, and $T_{TA}$ is stored in the $T_{TA}$ register. Thereafter, the $T_{TAT}$ for the connection is read from the $T_{TAT}$ register at box 223. Next, at box 226, the wrap state for the connection is read from another register. If, at box 229, the wrap state is either 10 or 11, then the $T_{TA}$ register is wrapped ahead of the $T_{TAT}$ register. At any given time, the $T_{TA}$ register may be wrapped ahead of the $T_{TAT}$ register multiple times. It is enough to know that it happened at least once. Thereafter, $T_{TA}$ must be greater than $T_{TAT}$. The cell, therefore, is conforming and is accepted at box 232. At box 235, a new $T_{TAT}$ is generated by adding I to $T_{TA}$ which re-synchronizes the wrap time base and eliminates the $T_{TA}$ wrap ahead condition. The value of I will be either 1/PCR or 1/SCR depending on which parameter is being monitored. With reference to box 238, if the new $T_{TAT}$ does not exceed $2^{25}-1$, i.e., the 25-bit $T_{TAT}$ register has not wrapped, the new $W_S$ is set to 00 at box 241. Otherwise, $W_S$ is set to 01 at box 244, indicating that the $T_{TAT}$ register wrapped ahead of the $T_{TA}$ register. In either case, the 25 least significant bits of the addition are stored in the $T_{TAT}$ register as the new $T_{TAT}$ value.

With reference to box 247, if the wrap state for the connection is 00, then the $T_{TA}$ and $T_{TAT}$ registers have not wrapped relative to each other, and the same tests used in the prior art leaky bucket GCRAs are used at boxes 250 and 253. At box 250, if $T_{TA} > T_{TAT}$, then the cell is accepted at box 232 and the sequence of boxes 235, 238 and either of 241 or 244 is performed as discussed above to determine the wrap state. If $T_{TA}$ NOT$>T_{TAT}$, then, at box 253, a determination as to whether $T_{TA}+L>T_{TAT}$ is made, where L is either CDVT or BT+CDVT. If the condition is not present, the cell is discarded at box 258. If the condition is met, the cell is accepted at box 261, and, at box 264, a new $T_{TAT}$ is generated by adding I to the current $T_{TAT}$ after which the sequence of boxes 235, 238 and either of 241 or 244 is performed as discussed above to determine the wrap state.

With reference to boxes 229 and 247 of FIG. 3, if $W_S$ is neither 1x or 00, then it is 01, which indicates that the $T_{TAT}$ register has wrapped ahead of the $T_{TA}$ register. $T_{TA}$ therefore cannot be greater than $T_{TAT}$. Rather than check for $T_{TA}+L>T_{TAT}$, as in the prior art GCRAs, according to the present invention, at box 267 the modified test in a system using 25-bit counters when $W_S=01$ is whether $T_{TA}+L>T_{TAT}+2^{25}$. If so, then a new $T_{TAT}$ is calculated at box 264 as $T_{TAT}+1$, and $W_S$ will remain 01, indicating that the $T_{TAT}$ register continues to be wrapped ahead of the $T_{TA}$ register. If not, the cell will be discarded at box 270.

This embodiment of the invention is based on the premise that at any given time the $T_{TAT}$ register can only be wrapped ahead of the $T_{TA}$ register once. This can be guaranteed by setting limits on the L and I values. For a cell to be accepted, the largest value of $T_{TAT}-T_{TA}$ is $L_{max}-1$. The largest value of $T_{TAT}$ is therefore $T_{TAmax}+L_{max}+I-1$. Since $T_{TA}$ and $T_{TAT}$ are both modulo $2^{25}$, the $T_{TAT}$ register cannot wrap ahead of the $T_{TA}$ register more than once provided that L+I is less than $2^{25}-1$. This restriction can be generalized as $L+I<2^n-1$, where n is the width of the time counter, and $T_{TAT}$ and $T_{TA}$ storage elements. The range of L or I may be increased simply by adding width to these elements. The L and I values of a particular UPC system can be set, as follows, such that this criteria is always met.

In one embodiment, a software provisionable 16 bit storage element will be used for I. At a 6.25 MHZ clock rate (160 ns), this allows PCR and SCR values as low as 95.4 cells/sec (I=(1/rate)(1/160 ns)=0xFFFF) and in excess of the 100K cells/sec (I=0x003E). For each leaky bucket, a software provisionable 25 bit storage element with a resolution 160 ns is used to specify L. The following is an example of a set of attainable requirements.

MBS=512 cells

Minimum SCR=150 cells/sec (i.e., 56 kb/s)

Maximum PCR=100K cells/sec

Maximum CDVT=1.024 ms $L_{max}=((MBS-1)[(1/SCR_{min})-(1/PCR_{max})]+CDVT)=3.41$ sec.

This corresponds to an L parameter of 3.41s/160 ns=0x144FB7E. Those skilled in the art will appreciate that larger values of L can be obtained. According to the particular embodiment of the present invention under discussion, however, there is a restriction that $(L+I)<(2^{25}-1)$.

Figure 1:
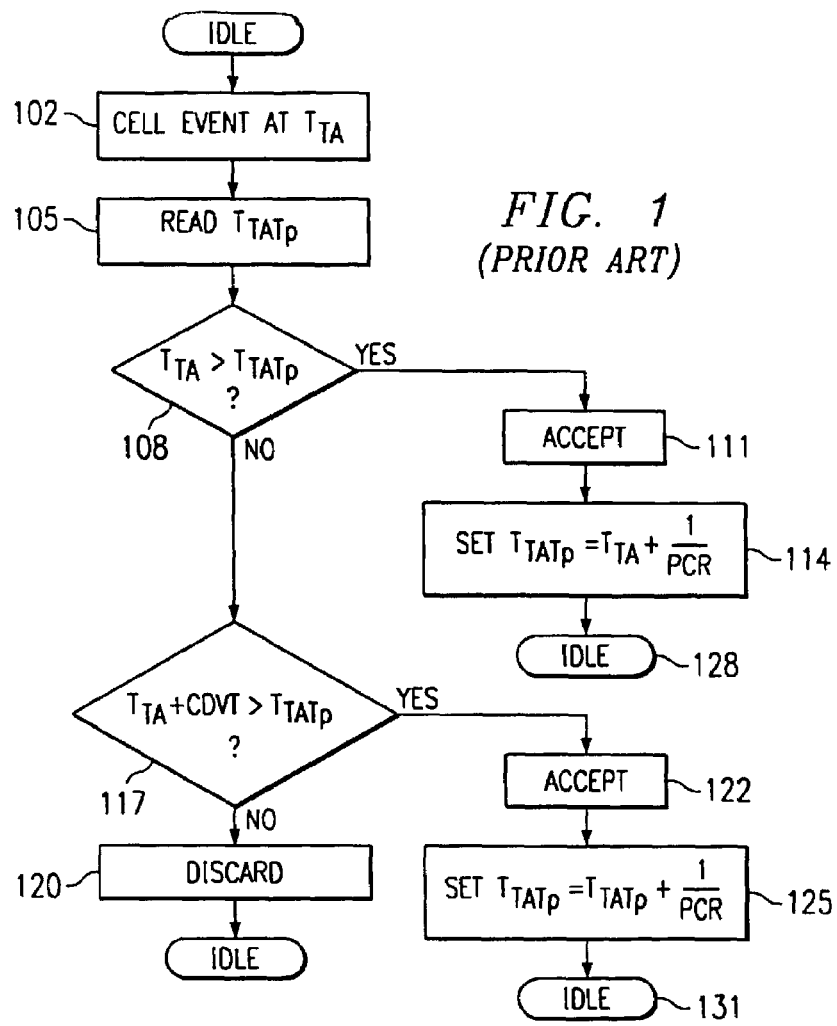
FIG. 1 is a flow chart illustrating the operation of a first prior art leaky bucket generic cell rate algorithm.
Figure 4:
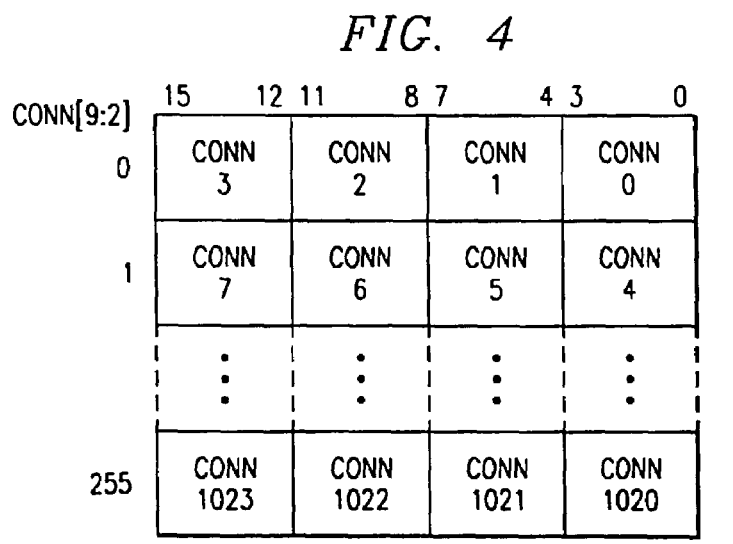
FIG. 4 depicts an example of a wrap state RAM partition according to the present invention for an ATM system capable of handling 1024 virtual connections.
Figure 2:
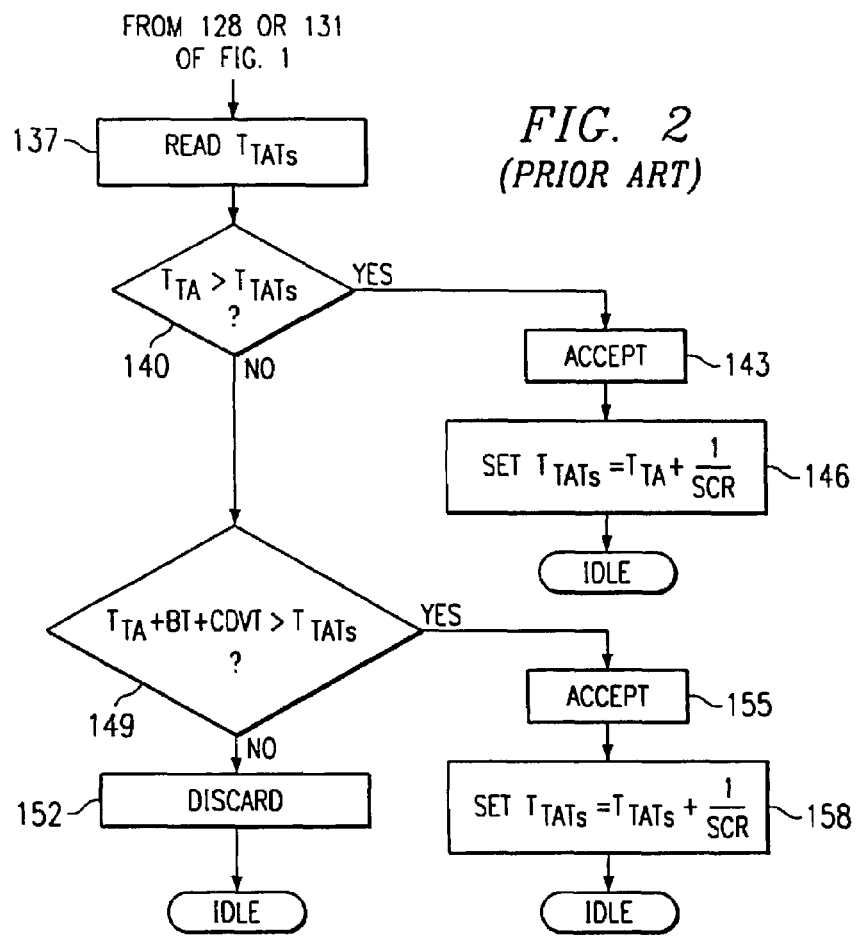
FIG. 2 is a flow diagram for a second prior art leaky bucket generic cell rate algorithm which may be used in conjunction with the leaky bucket algorithm of FIG. 1.

In a particular embodiment of the invention, the $W_S$ states are maintained in a RAM which is only processed by hardware. In a system with 1024 VCs, for example, the RAM is organized as 256×16. FIG. 4 shows a particular $W^S$ state RAM partition for the VCs. Since each VC may need as many as 4 bits for $W_S$ state bits (one $W_S$ state machine per GCRA), four VCs can be supported per 16 bit word. Using this RAM partition, the eight most significant bits of the VC identifier may be used to represent the RAM address.

In accordance with the present invention, the wrap state, $W_S$, for each VC is updated on a periodic audit basis each time the current time counter, i.e., the counter from which $T_{TA}$ is read, wraps. The audit state transitions are shown in the following Table:

TABLE 2

| $W_S$ | Next $W_S$ |
|---|---|
| 00 ($T_{TAT}$ register and $T_{TA}$ register are synchronized) | 10 ($T_{TA}$ register is wrapped ahead of $T_{TAT}$ register) |
| 01 ($T_{TAT}$ register is wrapped ahead of $T_{TA}$ register) | 00 ($T_{TAT}$ register and $T_{TA}$ register are synchronized) |
| 1X ($T_{TA}$ register is wrapped ahead of $T_{TAT}$ register) | 10 ($T_{TA}$ register is wrapped ahead of $T_{TAT}$ register) |

With reference to Table 2, if $W_S$ is 00, indicating that the $T_{TA}$ and $T_{TAT}$ registers are in synch with one another, and the current time counter then wraps, $W_S$ is updated to 10, indicating that the $T_{TA}$ register has wrapped ahead of the $T_{TAT}$ register. If $W_S$ is 01, indicating that the $T_{TAT}$ register is wrapped ahead of the $T_{TA}$ register, and the current time counter then wraps, $W_S$ is updated to 00 indicating that the $T_{TA}$ and $T_{TAT}$ registers are now in synch. If $W_S$ is 1x, indicating that the $T_{TA}$ register is wrapped ahead of the $T_{TAT}$ register, and the current time counter then wraps, $W_S$ is set to 10 indicating that the $T_{TA}$ register is still wrapped ahead of the $T_{TAT}$ register.

With this approach all relevant information required for wrap state processing of a GCRA can be summarized in two state bits. This permits the packing of such state information into conventional wide storage elements (e.g., ×16 RAM, ×32 RAM, etc.) and results in the ability to simultaneously process audits for multiple GCRAs and reduce the necessary RAM access bandwidth and clock cycles for such processing.

Multi-Phase Current Time Counter

One potential problem which may be encountered when implementing the above-described improved UPC system is that in ATM systems handling a large number of VCs, the time needed to perform the wrap state audits may be prohibitively high, as cell processing is put on hold during such audits. In these situations the cell processing latency for updating the $W_S$ for all VCs may be minimized by breaking the VCs into a predetermined number of groups and performing the wrap state audits on a staggered group-by-group basis rather than auditing all VCs at once. By way of example, in an ATM system handling 1024 VCs, sixteen groups of 64 VCs can be created. If sixteen different phases of the current time counter are maintained, 16 unique wrap events will occur. The VCs may be broken into 16 audit groups of 64 VCs as shown in the following table:

TABLE 3

| VC Identifier | $W_S$ Audit and Current Time Phase Group |
|---|---|
| 0000000000 through 0000111111 | 0 |
| 0001000000 through 0001111111 | 1 |
| . | . |
| . | . |
| . | . |
| 1110000000 through 1110111111 | 14 |
| 1111000000 through 1111111111 | 15 |

The groups are audited in a round robin fashion. In a system having 25-bit counters and a 6.25 MHZ counter clock (one quarter of a 25 MHZ system clock), the audits are spaced by approximately 335 ms ($2^{21}$×160 nsec) with each group being updated every 5.368 seconds ($2^{25}$×160 nsec). The 64 VCs in a group can be serviced in 32 clocks at 40 nsec (i.e., 64 VCs×(2 accesses/4 VCs)×1clock/access). Those skilled in the art will appreciate that the audit time can be reduced by any of a number of design choices, e.g., using wider RAMs or using faster system clocks.

Figure 5:
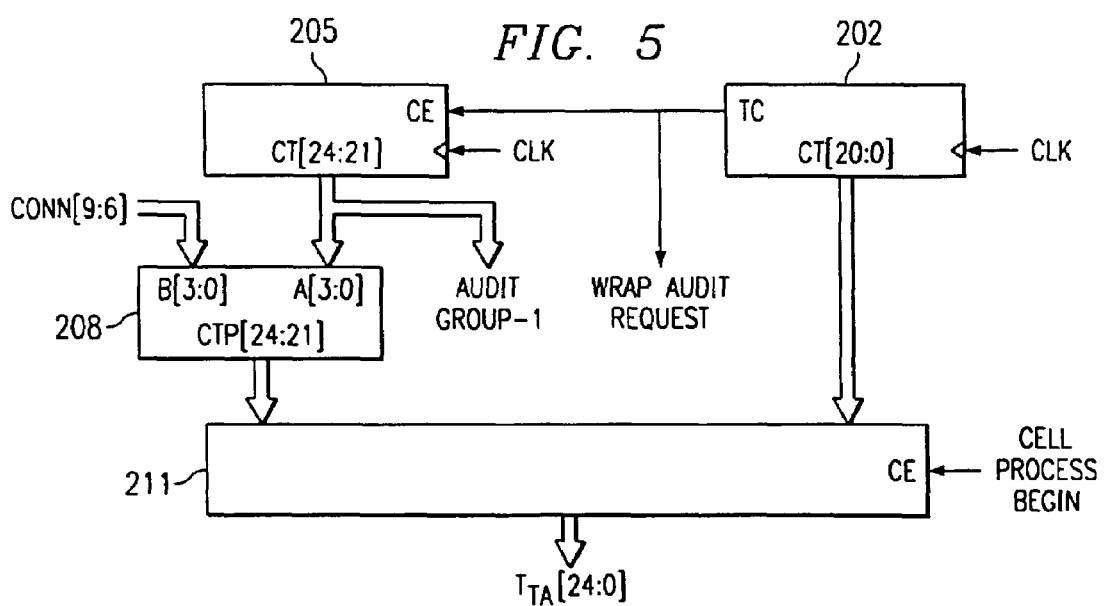
FIG. 5 is a block diagram of one particular implementation for maintaining arrival time and sixteen current time phases in accordance with the present invention.

FIG. 5 illustrates a particular implementation for maintaining $T_{TA}$ and the sixteen current time phases in accordance with the present invention. Counter 202 keeps the 21 least significant bits of the 25-bit current time counter while counter 205 keeps the four most significant bits. For every wrap of counter 205, counter 202 wrap sixteen times and, consequently, trigger its terminal count (TC) output sixteen times. The TC output is used both to trigger counter 205 and to issue a wrap audit request as shown in the figure. On which of the sixteen groups of VCs shown in Table 3 the $W_S$ audit will be performed is determined by the four most significant bits of the 25-bit current time (CT) counter which are shown in FIG. 5 as the output of counter 205 labeled Audit Group-1.

Rather than use sixteen separate but synchronized 25-bit counters to create the sixteen phases of current time described above, a 4 bit subtractor 208, where input A is subtracted from input B, is used. Input A of the subtractor 208 is the four most significant bits of the 25-bit current time counter, i.e., the output from counter 205. Input B is the four most significant bits of the VC identifier of the cell being processed. The four most significant bits of the VC identifier indicate which of the sixteen $W_S$ audit and current time phase groups the VC is in, as shown in Table 3 above. The 4-bit output of the subtractor 208 is used as the four most significant bits for each of the sixteen current time phases (CTP) at the start of the cell processing, while the 21 least significant bits are the same as the current time counter, i.e., the output from counter 202. In this way, sixteen current time phases, each offset from one another by one-sixteenth of the total time kept by the 25-bit current time counter, are maintained. Upon the arrival of a cell, a cell process begin signal causes element 211 to read as the arrival time, $T_{TA}$, the output of subtractor 208 as its four most significant bits and the output of counter 202 as its 21 least significant bits.

While this invention has been described with reference to several illustrative examples and embodiments, they should not be interpreted as limiting the scope or spirit of the attributes invention. In actual practice many modifications may be made by those of ordinary skill in the art without deviating from the scope of the invention as expressed in the appended claims.

What is claimed is:

1. A method for maintaining a relative wrap state between registers, comprising:

maintaining a first register that keeps track of a first time corresponding to the occurrence of an event;

maintaining a second register that keeps track of a second time, the second time indicating a theoretical time at which the event complies with a predetermined usage parameter;

monitoring most significant bits of a binary time count;

updating a wrap state between the first register and the second register whenever the most significant bits reach a specified value; and determining based on the wrap state whether either of the first register or the second register has wrapped relative to the other prior to comparing the values stored in the registers; and if either the first register or the second register has wrapped relative to the other, adding a predetermined correction factor to one of the registers prior to comparing the registers.

2. The method of claim 1 wherein the determining step comprises the steps of:

maintaining the wrap state in a storage element; and
reading the wrap state.

3. The method of claim 2 wherein the storage element is RAM.

4. The method of claim 2 wherein the updating step comprises the step of updating the wrap state whenever a portion of the binary time count excluding the most significant bits of the current time counter wraps.

5. The method of claim 4 wherein the updating step comprises the following steps for each of the wrap states to be updated:

if the wrap state indicates that the first register and second register are not wrapped relative to one another, setting the wrap state to indicate that the first register has wrapped ahead of the second register;

if the wrap state indicates that the first register is wrapped ahead of the second register, maintaining the same wrap state; and if the wrap state indicates that the second register is wrapped ahead of the first register, setting the wrap state to indicate that the first register and second register are not wrapped relative to one another.

6. A method for determining if an event complies with at least one predetermined usage parameter, comprising:
   maintaining a wrap state between a first register and a second register;
   monitoring most significant bits of a binary time count;
   updating the wrap state whenever the most significant bits reach a specified value;
   determining an occurrence time at which an event occurs;
   storing the occurrence time in the first register;
   storing a theoretical time at which the occurrence of the event complies with a predetermined usage parameter from the second register;
   if the wrap state indicates that the second register has wrapped ahead of the first register, checking whether the sum of the occurrence time and a predetermined compliance factor is greater than the theoretical time plus a predetermined correction factor; and
   if the sum of the occurrence time and a predetermined compliance factor is greater than the theoretical time plus the predetermined correction factor, accepting the cell as complying with the at least one usage parameter.

7. The method of claim 6 further comprising the steps of:
   recalculating the theoretical time by adding a predetermined number;
   storing the recalculated theoretical time in the second register;
   determining whether the second register has wrapped; and
   setting the wrap state in accordance with the determination of whether the second register has wrapped.

8. The method of claim 7 wherein the predetermined number is a function of the at least one parameter.

9. The method of claim 6 further comprising the step of if the sum of the occurrence time and a predetermined compliance factor is less than the theoretical time plus the predetermined correction factor, taking a remedial measure.

10. The method of claim 9 wherein:
    the event comprises receiving information; and
    the remedial measure comprises discarding the information from a buffer.

11. The method of claim 9 wherein:
    the event comprises receiving information; and
    the remedial measure comprises tagging the information with an indication that the information does not comply with the at least one predetermined usage parameter.

12. The method of claim 9 wherein the correction factor is 2n, where n is the number of bits in the second register.

13. The method of claim 6 wherein the correction factor is 2n, where n is the number of bits in the second register.

14. A method for determining if an event is in compliance with at least one usage parameter, comprising:
    maintaining a wrap state between a first register and a second register;
    monitoring most significant bits of a binary time count;
    updating the wrap state whenever the most significant bits reach a specified value;
    determining an occurrence time for an event;
    storing the occurrence time in a first register;
    storing a theoretical time at which the event complies with the at least one usage parameter from the second register;
    if the wrap state indicates that the first register has wrapped ahead of the second register, determining that the event complies with the at least one usage parameter.

15. The method of claim 14 further comprising the steps of:
    recalculating the theoretical time by adding a predetermined number to the occurrence time;
    storing the recalculated theoretical time in the second register;
    determining whether the second register has wrapped; and
    setting the wrap state in accordance with the determination of whether the second register has wrapped.

16. The method of claim 15 wherein the predetermined number is a function of the at least one parameter.

17. A method for comparing a first register storing a first value that increases over time to a second register storing a second value that increases over time, comprising:
    maintaining a wrap state between a first register and a second register;
    monitoring most significant bits of a binary time count;
    updating the wrap state whenever the most significant bits reach a specified value, wherein updating the wrap state comprises:
       if the wrap state indicates that the first register and second register are not wrapped relative to one another, setting the wrap state to indicate that the first register has wrapped ahead of the second register;
       if the wrap state indicates that the first register is wrapped ahead of the second register, maintaining the same wrap state; and
       if the wrap state indicates that the second register is wrapped ahead of the first register, setting the wrap state to indicate that the first register and second register are not wrapped relative to one another; and
    determining whether either of the first register or the second register has wrapped relative to the other prior to comparing the registers.

18. The method of claim 17 where the first value is a cell arrival time and the second value is a theoretical arrival time.

19. The method of claim 17 further comprising the additional step of, if either the first register or the second register has wrapped relative to the other, adding a predetermined correction factor to one of the values prior to comparing the registers.

* * * * *

UNITED STATES PATENT AND TRADEMARK OFFICE
CERTIFICATE OF CORRECTION

PATENT NO. : 7,286,478 B2
APPLICATION NO. : 10/260174
DATED : October 23, 2007
INVENTOR(S) : Michael P. Bottiglieri et al.

It is certified that error appears in the above-identified patent and that said Letters Patent is hereby corrected as shown below:

Column 3, Line 10, after "152 and" delete "$T_{TATS}$" and insert -- $T_{TATs}$ --.
Column 5, Line 59, after "264 as" delete "$T_{TAT+}1$" and insert -- $T_{TAT}+ I$ --.
Column 6, Line 34, after "particular" delete "$W^S$" and insert -- $W_S$ --.
Column 7, Line 57, after "counter 202" insert -- will --.

Signed and Sealed this

Twenty-first Day of October, 2008

JON W. DUDAS
*Director of the United States Patent and Trademark Office*